US009641328B1

United States Patent
Bennett et al.

(10) Patent No.: US 9,641,328 B1
(45) Date of Patent: May 2, 2017

(54) GENERATION OF PUBLIC-PRIVATE KEY PAIRS

(71) Applicant: IONU SECURITY, INC., Campbell, CA (US)

(72) Inventors: David W. Bennett, Longmont, CO (US); Alan M. Frost, Reno, NV (US)

(73) Assignee: IOnU Security, Inc., Campbell, CA (US)

( * ) Notice: Subject to any disclaimer, the term of this patent is extended or adjusted under 35 U.S.C. 154(b) by 209 days.

(21) Appl. No.: 14/202,976

(22) Filed: Mar. 10, 2014

(51) Int. Cl.
*H04L 9/00* (2006.01)
*H04L 9/08* (2006.01)
*H04L 9/30* (2006.01)

(52) U.S. Cl.
CPC .............. *H04L 9/0869* (2013.01); *H04L 9/30* (2013.01)

(58) Field of Classification Search
CPC .................................. H04L 9/30; H04L 9/0869
See application file for complete search history.

(56) References Cited

U.S. PATENT DOCUMENTS

| 5,201,000 | A  | * | 4/1993  | Matyas  | G06F 9/30003 |
|           |    |   |         |         | 380/30 |
| 7,630,986 | B1 | * | 12/2009 | Herz    | G06Q 10/10 |
| 2009/0276839 | A1 | * | 11/2009 | Peneder | G06F 21/31 |
|           |    |   |         |         | 726/8 |
| 2011/0289318 | A1 | * | 11/2011 | Zhang   | H04L 9/3247 |
|           |    |   |         |         | 713/176 |
| 2012/0331287 | A1 | * | 12/2012 | Bowman  | H04L 9/3273 |
|           |    |   |         |         | 713/156 |

* cited by examiner

*Primary Examiner* — Fatoumata Traore
*Assistant Examiner* — Khoi Le
(74) *Attorney, Agent, or Firm* — Crawford Maunu PLLC

(57) ABSTRACT

Methods and systems are disclosed for generating a public-private key pair. A programmed processor displays a plurality of questions and inputs two or more answers to two or more of the plurality of questions in response to user input. The processor computes the public-private key pair as a function of the two or more answers to the two or more questions and stores the public-private key pair in memory coupled to the processor.

26 Claims, 5 Drawing Sheets

GENERATION OF PUBLIC-PRIVATE KEY PAIRS

FIELD OF THE INVENTION

The disclosure generally relates to approaches for generating public-private key pairs.

BACKGROUND

Prior to the advent of high-speed communications and the proliferation of mobile computing devices such as notebook computers, tablet computers, and smart phones, a user typically accessed data via a single device. With limited means of accessing data, a password and simple encryption often sufficed for security. Now, with a user having access to multiple stationary workstations and multiple mobile computing devices, data may be accessed almost anywhere. Enhanced security measures are not only desired but in many applications required.

Managing the authentication and encryption keys is challenging when a user has many different devices. If the security mechanism is too cumbersome for the user to navigate on multiple devices, the user may bypass the available security measures, thereby jeopardizing the safekeeping of the user's data. On the other hand, the security mechanism cannot be so basic that unauthorized parties may gain access to the user's data.

SUMMARY

In one implementation, a method of generating a public-private key pair includes performing a number of operations on a programmed processor. A plurality of questions are displayed, and the processor inputs two or more answers to two or more of the plurality of questions in response to user input. The public-private key pair is computed by the processor as a function of the two or more answers to the two or more questions. The public-private key pair is stored in memory coupled to the processor.

In a method of provisioning a public-private key pair on a plurality of systems, a first programmed processor of an initial system of the plurality of systems performs operations including displaying a plurality of questions and inputting a first set of two or more answers to two or more of the plurality of questions in response to first user input. The first processor computes a first public-private key pair as a function of the first set of the two or more answers to the two or more questions, stores the first public-private key pair in memory of the initial system, and transmits data to a server indicating the two or more questions. A second programmed processor of each system of one or more others of the plurality of systems requests the data indicating the two or more questions from the server and receives the data indicating the two or more questions. The second processor displays the two or more questions indicated by the data received from the server and inputs a second set of two or more answers to the two or more questions in response to second user input. The second processor computes a second public-private key pair as a function of the second set of the two or more answers and stores the second public-private key pair in memory of the system.

A system for establishing a public-private key pair on a plurality of systems includes a memory and a processor coupled to the memory. The memory is configured with instructions that when executed by the processor cause the processor to download a security program to an initial requesting device in response to a request from the initial requesting device. The security program when executed on the initial requesting device is configured to cause the initial requesting device to display a plurality of questions and input a first set of two or more answers to two or more of a plurality of questions in response to user input. The downloaded security program is further configured to compute the public-private key pair as a function of the first set of two or more answers to the two or more questions, store the public-private key pair in memory of the initial requesting device, and transmit data indicative of the two or more questions to the server.

In another implementation, a system is provided for establishing a public-private key pair. The system includes a memory and a processor coupled to the memory. The memory is configured with instructions that when executed by the processor cause the processor to display a plurality of questions and input a first set of two or more answers to two or more of a plurality of questions in response to user input. The processor computes the public-private key pair as a function of the first set of two or more answers to the two or more questions, stores the public-private key pair in the memory, and transmits data indicative of the two or more questions to the server.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which.

DETAILED DESCRIPTION OF THE DRAWINGS

The disclosed methods and systems generate a public-private key pair that may be used on one or more systems or devices. The key pair may be used for either authentication or encryption/decryption of a user's data. In one or more implementations, the public-private key pair is generated based on the user's answers to a set of questions. The system displays the set of questions to the user and inputs data that specify the user's answers to those questions. The data that specify the user's answers are used to compute the values of the public-private key pair.

In another implementation, a public-private key pair is established on an initial system and then established on one or more additional systems. The initial system and additional systems may also be referred to herein as mobile computing devices or client systems. By using the same set of questions on multiple systems or devices, the same public-private key pair may be easily established on those systems or devices. When the public-private key pair is established on the initial system, data that specify the questions that were answered are transmitted to a server for storage. When the public-private key pair is to be established on a second system, the second system requests from the server the set of questions, or indications thereof, that were answered on the initial system. The second system then displays the set of questions to the user and inputs data that specify the user's answers to those questions. The second system uses the data that specify the user's answers to compute the values of the public-private key pair, which is stored for subsequent access on the second system.

Figure 1:
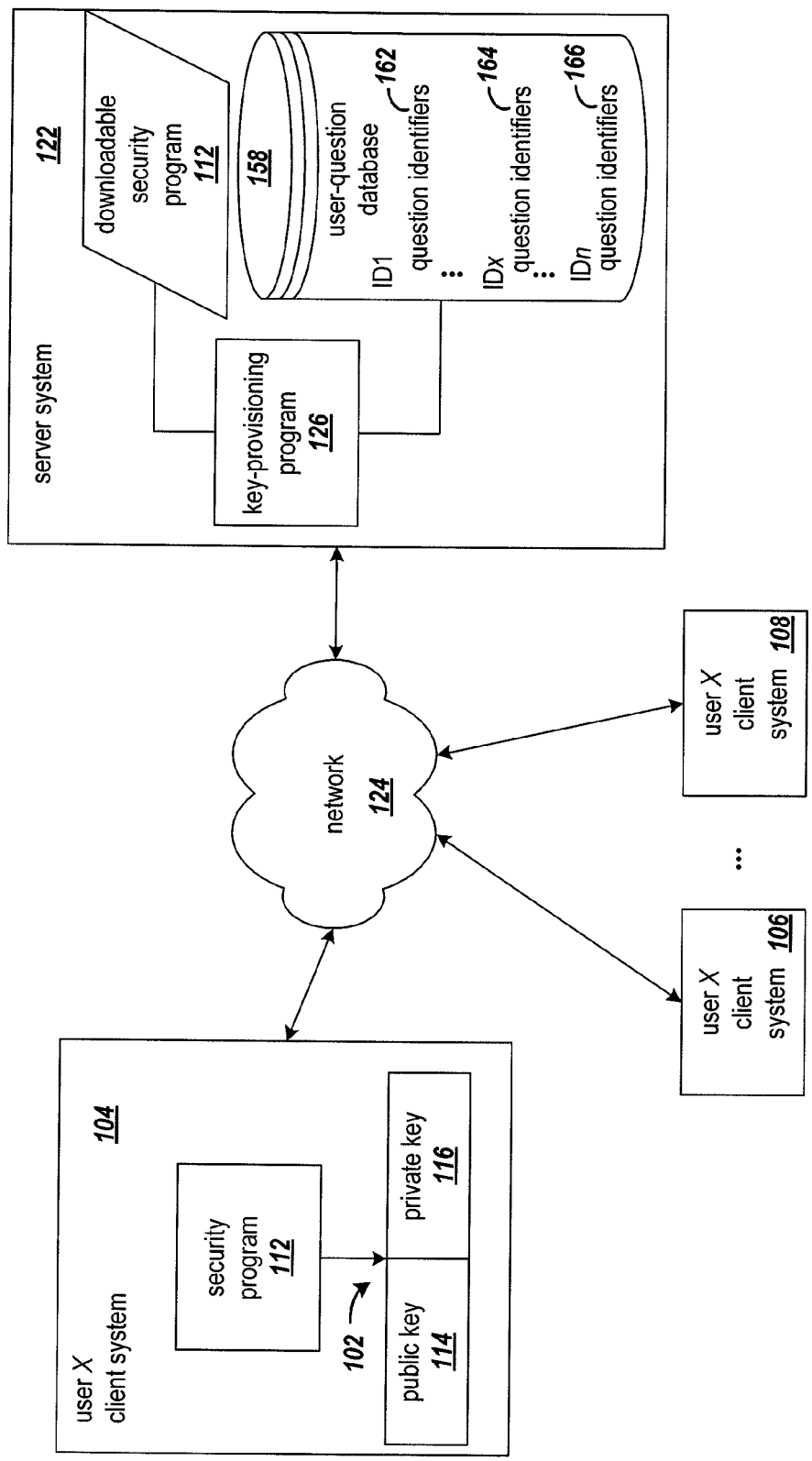
FIG. 1 shows a system for establishing a public-private key pair on multiple client systems.

FIG. 1 shows a system for establishing a public-private key pair 102 on multiple client systems 104, 106, and 108. Each of the client systems executes security program 112, which is stored in downloadable form on the server system 122, to establish a local copy of the public-private key pair 102. The client systems will be referred to as clients, and the server system will be referred to as a server for brevity.

The public-private key pair 102 may be initially established on client 104, and thereafter on clients 106 and 108. The clients are communicatively coupled to the server by network 124, which may be the Internet, for example. The client 104 interfaces with the key-provisioning program 126 on the server 122 to download the security program 112. The security program displays a set of questions to the user of client 104. In an example implementation, the user may select a subset of those questions and enter answers to the selected questions. In order to increase security, a user may be encouraged or required to select multiple questions. Example questions include:

What is your mother's maiden name?
What is your father's middle name?
What are the make, model and color of your first car?
What is the name of the maid of honor in your wedding?
What is your favorite food?
What is your favorite color?
What is your favorite musician/musical group?
What is your favorite artist?
What is the address of your first home?
What is your favorite athlete or sports team?

In addition to answering selected questions, a passphrase may be solicited from the user alone or in combination with the user selecting and answering certain questions. A passphrase is generally a sequence of two or more words that may or may not form a sentence. An example passphrase is, "my monstrous mosquito makes marvelous marmalade." The client's query to a user for entry of a passphrase is also referred to as a question, and the passphrase entered by the user is also referred to as an answer.

The client 104 inputs the answers entered by the user and computes the public-private key pair 102 as a function of the input answers. The computed key-pair includes public key 114 and the associated private key 116. In an example implementation, a seed value is generated from the answers. For example, data representing the answers may be concatenated in a particular order, and one or more cryptographic functions applied to the concatenation to generate a seed value. From the seed value, one or more prime pseudo-random numbers are generated, and the public-private key pair is computed as a function of the one or more pseudo-random numbers. Generally available cryptographic software modules may be executed to compute the seed value, prime pseudo-random numbers and the public-private key pair.

The client 104 stores the generated public-private key pair in local memory and transmits data to the key-provisioning program on server 122 to indicate the questions selected by the user. The key-provisioning program maintains a user-question database 158 that indicates a set of question identifiers for each user, but it does not store the answers. Each set of question identifiers indicates the set of questions selected by the associated user to generate the user's public-private key pair. The database is shown as having sets of question identifiers 162, 164, and 166 associated with user identifiers (IDs) ID1, IDx, and IDn, respectively. The key-provisioning program stores the set of question identifiers received from the security program 112 executing on client 104. The set of question identifiers from client 104 and user X is stored as set 164 in association with IDx in the database 158. IDx is the user ID for user X, who entered the answers to the questions on client 104.

To establish the key pair 102 on another client, for example, client 106, an instance of the security program 112 is downloaded to that client. User X logs-in to the security program, and the security program interfaces with the key-provisioning program 126 and determines that user X has initially established a set of questions. The security program requests and receives the set of question identifiers 164 associated with IDx for User X. The security program executing on client 106 then displays the questions identified in the set of question identifiers and inputs the answers entered by User X at the client. The answers are concatenated in the same order as the order of answers on client 104. The public-private key pair is computed as a function of the answers input at client 106 as previously described, and the public-private key pair is stored in memory of client 106.

Figure 2:
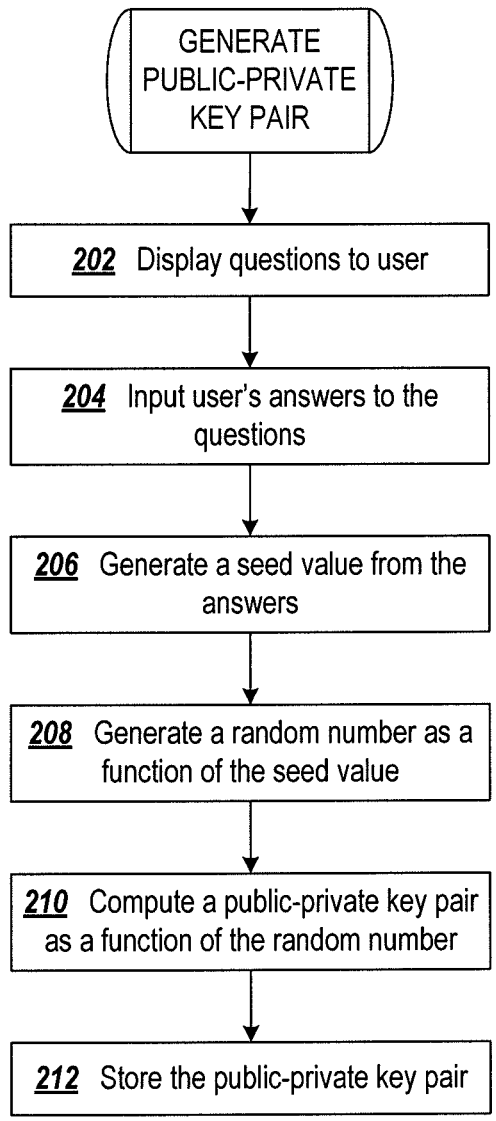
FIG. 2 shows a flowchart of a general process for generating a public-private key pair.

FIG. 2 shows a flowchart of a general process for generating a public-private key pair. At block 202, a set of questions is displayed, and at block 204, the answers to those questions as entered by the user are input. At block 206, a seed value is generated from the input answers. In an example implementation, the seed value may be generated by performing one or more cryptographic operations on the answers. For example, a cryptographic hash operation may be performed on a variable-length input string, such as a concatenation of the answers, to produce a fixed-length output string. The fixed-length output string is sometimes referred to as a digest, which is the seed value in the process described herein.

At block 208, the seed value is input to a pseudo-random number generator, and one or more prime random numbers are generated as a function of the seed value. In an example implementation, a Deterministic Random Bit Generator (DRBG) and a primality checking algorithm are used to generate the prime pseudo-random number(s). At block 210, a public-private key pair is computed as a function of the one or more prime random numbers from block 208. Many commercially available software libraries have functions for generating pseudo-random numbers and public-private key pairs.

At block 212, the public-private key pair is stored in a memory. The memory may be the volatile or non-volatile memory/storage of the client or device on which the key pair is established. The public-private key pair is most often stored within an encrypted key store in client memory/storage to prevent unauthorized access.

Figure 3:
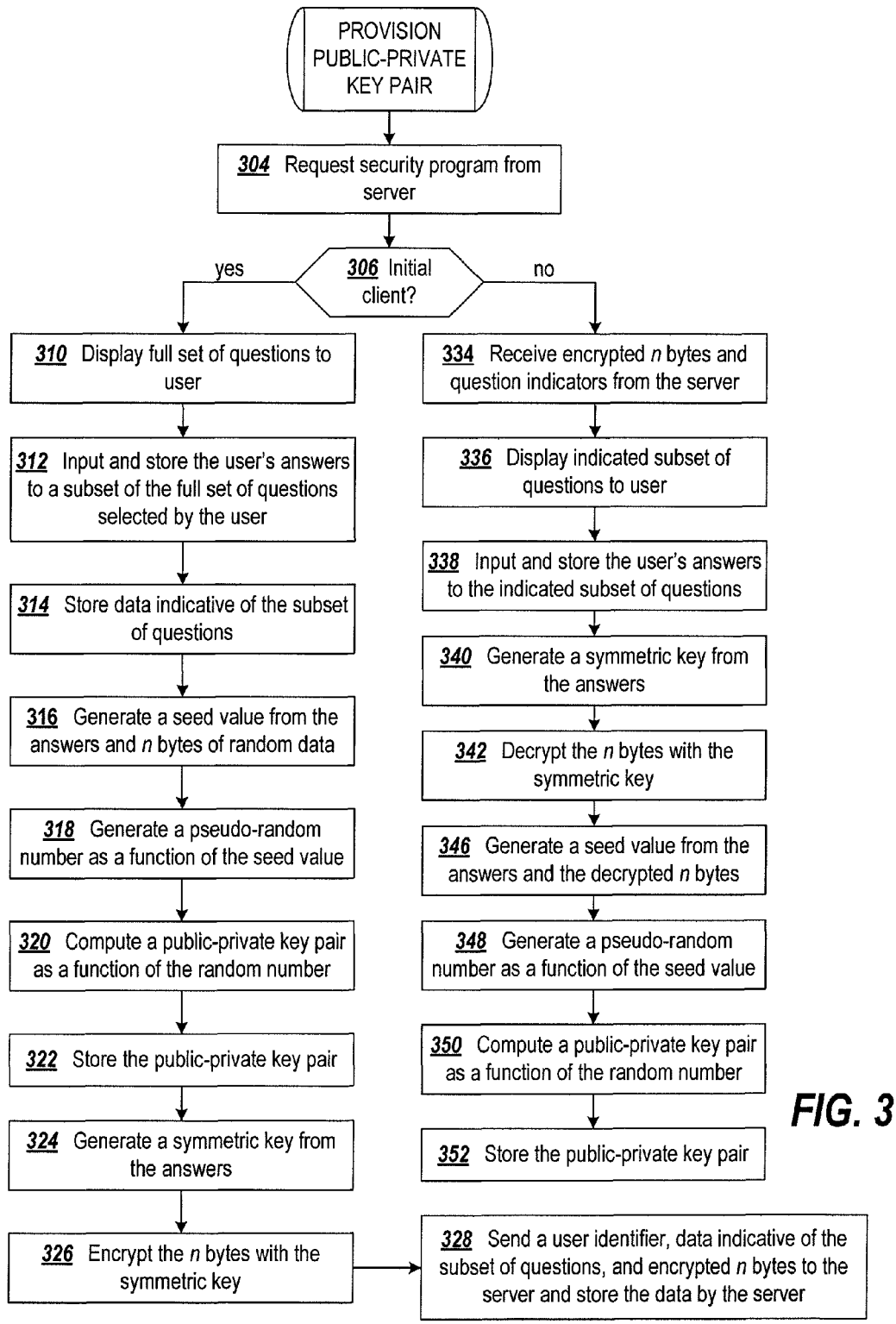
FIG. 3 shows a flowchart of a process for provisioning a public-private key pair on multiple clients.

FIG. 3 shows a flowchart of a process for provisioning a public-private key pair on multiple clients. At block 304, the client interfaces with a server and requests a download of a security program for provisioning a key pair. The executing security program determines at decision block 306 whether or not the client is the initial client on which the key pair is to be established. In other words, the process checks whether or not the key pair has been already established on another client. This may be accomplished by the client providing a user ID to the server, the server checking whether or not that user ID has an associated set of question identifiers in the database 158 (FIG. 1), and indicating whether or not the user ID exists with information transmitted with the security program.

If the client is the initial client, at block 310, the client displays a full set of questions to the user. At block 312, the answers entered to the subset of questions selected by the user are input and stored in a memory of the client. In addition, the client stores data that indicate the subset of questions that was selected at block 314. The data that indicate the subset of questions may also specify the order in which the questions are to be answered or the order in which the user's answers are to be assembled. To generate the same seed value on different clients, the order of the answers is maintained across the clients.

At block 316, a seed value is generated. In one implementation, the seed value is generated from the answers entered by the user. In another implementation, the answers are combined with n bytes of random data. The random data is obtained from a cryptographically secure random number generator. The further processing performed on and using the n bytes of random data as described below is also optional. One or more prime pseudo-random numbers are generated from the seed value at block 318, and block 320 computes a public-private key pair as a function of the one or more prime pseudo-random numbers. The key pair is stored in local memory of the client at block 322.

At block 324, a symmetric key is generated from the answers using a standard key derivation algorithm, and the n bytes of random data are encrypted with the symmetric key at block 326. The encrypted n bytes of random data, the user ID, and data indicative of the subset of questions selected by the user are transmitted to the server at block 328. The encrypted n bytes of random data provide additional protection against attackers attempting to generate the key pair and ensure that if different users have the same ordered question set and answers, the generated key pairs will be unique.

If the client is not the initial client, at block 334, the client receives the data indicating the subset of questions selected by the user. The client may also receive the encrypted n bytes of random data in some implementations. At block 336, the selected questions are displayed, and at block 338, the user's answers are input and stored in memory of the client.

At block 340, a symmetric key is generated from the user's answers, and the encrypted n bytes of random data received from the server are decrypted using the symmetric key at block 342. A seed value is generated from the user's answers and the decrypted n bytes of random data at block 346, and at block 348, one or more prime pseudo-random numbers are generated as a function of the seed value. At block 350, a public-private key pair is computed as a function of the one or more pseudo-random numbers, which were generated at block 350. The key pair is stored in memory of the client at block 352.

Figure 4:
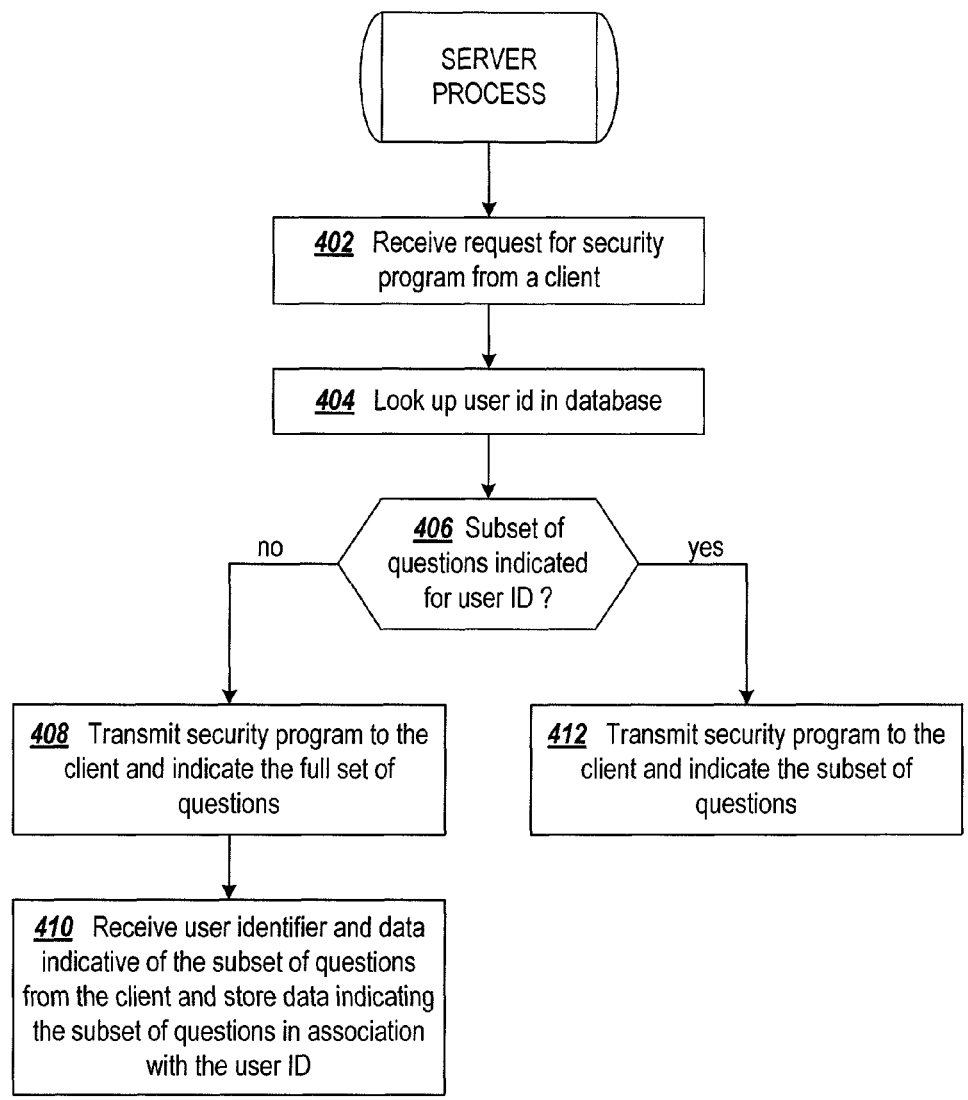
FIG. 4 shows a flowchart of a process performed by a server in provisioning a public-private key pair on multiple clients.

FIG. 4 shows a flowchart of a process performed by a server in provisioning a public-private key pair on multiple clients. At block 402, the server receives a request from a client to download the security program 112 (FIG. 1). The request from the client includes the user ID of the user requesting the security program, and at block 404, the server looks-up the user ID in the database 158 (FIG. 1). If that user ID is not present in the database with data that indicate an associated subset of questions, decision block 406 directs the process to block 408. The security program is transmitted from the server to the client at block 408. At block 410, the server receives from the security program executing on the client, the user ID and data indicating the subset of questions selected by the user. The server stores the data indicating the subset of questions in association with the user ID. In an example implementation, the server also receives the encrypted n bytes of random data and stores the encrypted data in association with the user ID.

If the user ID is present in the database, decision block 406 directs the process to block 412. At block 412, the server transmits the security program to the client, along with data that indicate the subset of questions associated with the user ID. In an implementation in which n bytes of encrypted random data are used in conjunction with the user's answers, the n bytes of encrypted random data associated with the user ID are also transmitted to the client at block 412.

Figure 5:
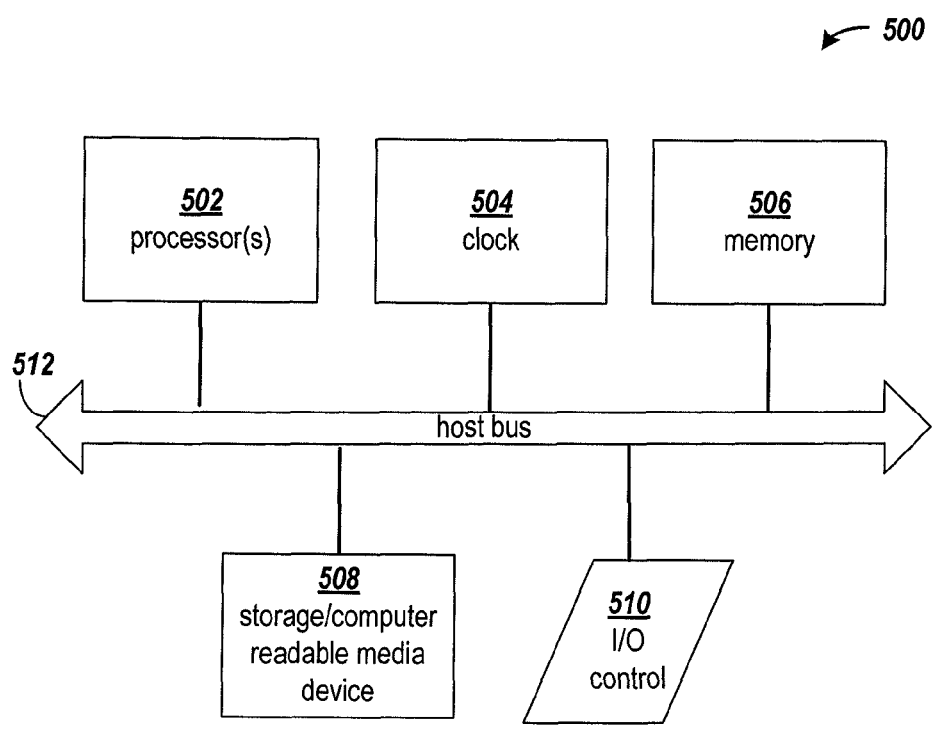
FIG. 5 is a block diagram of an example computing arrangement on which the processes described herein may be implemented.

FIG. 5 is a block diagram of an example computing arrangement on which the processes described herein may be implemented. The example computing arrangement may be suitable for implementing the clients and server shown in FIG. 1. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 500 includes one or more processors 502, a clock signal generator 504, a memory arrangement 506, a storage arrangement 508, and an input/output control unit 510, all coupled to a host bus 512. The arrangement 500 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 502 may be one or more general purpose processors, or a combination of one or more general purpose processors and suitable co-processors, or one or more specialized processors (e.g., RISC, CISC, pipelined, etc.).

The memory arrangement 506 typically includes multiple levels of cache memory, and a main memory. The storage arrangement 508 may include local and/or remote persistent storage, such as provided by magnetic disks (not shown), flash, EPROM, or other non-volatile data storage. The storage unit may be read or read/write capable. Further, the memory arrangement 506 and storage arrangement 508 may be combined in a single arrangement.

The processor(s) 502 executes the software in storage arrangement 508 and/or memory arrangement 506, reads data from and stores data to the storage arrangement 508 and/or memory arrangement 506, and communicates with external devices through the input/output control arrangement 510. These functions are synchronized by the clock signal generator 504. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for generating cryptographic keys. Other aspects will be apparent to those skilled in the art from consideration of the specification. The methods and systems may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method of generating a public-private key pair, comprising:
    on a programmed processor of a first system, performing operations including:
        displaying a plurality of questions;
        inputting two or more answers to two or more of the plurality of questions in response to user input;
        computing the public-private key pair based on the two or more answers to the two or more questions;
        wherein the computing of the public-private key pair includes:
            generating a seed value from the two or more answers,
            generating one or more pseudo-random numbers as a function of the seed value, and
            computing the public-private key pair as a function of the one or more pseudo-random numbers;
        transmitting to a server, data that indicate the two or more questions selected by the user, that does not indicate the answers to the two or more questions, and that is downloadable from the server for generating the public-private key pair on another system for performing one of authentication or encryption on the first system and the other system using the public-private key pair; and
        storing the public-private key pair in memory coupled to the processor.

2. The method of claim 1, wherein each of the one or more pseudo-random numbers is prime.

3. The method of claim 1, wherein the generating of the seed value includes performing one or more cryptographic operations on the two or more answers to generate the seed value.

4. The method of claim 1, wherein at least one of the two or more answers is a passphrase.

5. The method of claim 1, further comprising selecting the two or more questions in response to user input, wherein the two or more questions are less than the plurality of questions.

6. The method of claim 5, wherein the data transmitted to the server indicating the two or more questions specifies an order of the two or more questions.

7. The method of claim 6, wherein:
    an order of the two or more answers corresponds to the order of the two or more questions; and
    the computing of the public-private key pair includes computing the public-private key pair as a function of data representing the two or more answers and ordered according to the order of the two or more answers.

8. The method of claim 1, further comprising:
    wherein, the generating of the seed value includes generating n bytes of random data and generating the seed value from the two or more answers and the n bytes of random data;
    generating a symmetric key from the two or more answers;
    encrypting the n bytes of random data into encrypted n bytes using the symmetric key; and
    transmitting to a server data including the encrypted n bytes and indicating the two or more questions selected by the user.

9. A method of provisioning a public-private key pair on a plurality of systems, comprising:
    on a first programmed processor of an initial system of the plurality of systems, performing operations including:
        displaying a plurality of questions;
        inputting a first set of two or more answers to two or more of the plurality of questions in response to first user input;
        computing a first public-private key pair based on the first set of the two or more answers to the two or more questions;
        wherein the computing of the first public-private key pair by the first programmed processor includes:
            generating a first seed value from the first set of two or more answers,
            generating a first set of one or more pseudo-random numbers as a function of the first seed value, and
            computing the first public-private key pair as a function of the first set of one or more pseudo-random numbers;
        storing the first public-private key pair in memory of the initial system; and
        transmitting to a server data that indicate the two or more questions and that does not indicate the answers to the two or more questions; and
    on a second programmed processor of each system of one or more others of the plurality of systems, performing operations including:
        requesting the data indicating the two or more questions from the server and receiving the data indicating the two or more questions; and
        displaying the two or more questions indicated by the data received from the server;
        inputting a second set of two or more answers to the two or more questions in response to second user input;
        computing a second public-private key pair based on the second set of the two or more answers; and
        wherein the computing of the second public-private key pair by the second programmed processor includes:
            generating a second seed value from the second set of two or more answers,
            generating a second set of one or more pseudo-random numbers as a function of the second seed value, and
        computing the second public-private key pair as a function of the second set of one or more pseudo-random numbers; and
        storing the second public-private key pair in memory of the system.

10. The method of claim 9, further comprising:
    wherein, on the first programmed processor the generating of the first seed value includes generating n bytes of random data and generating the first seed value from the first set of two or more answers and the n bytes of random data;
    on the first programmed processor of the initial system, performing operations including:
        generating a first symmetric key from the first set of two or more answers;

encrypting the n bytes of random data into encrypted n bytes using the first symmetric key;

transmitting the encrypted n bytes to the server;

on the second programmed processor, performing operations including:

receiving the encrypted n bytes from the server;

generating a second symmetric key from the second set of two or more answers; and decrypting the encrypted n bytes into decrypted n bytes of random data using the second symmetric key;

wherein, on the second programmed processor the generating of the second seed value includes generating the second value from the second set of two or more answers and the decrypted n bytes of random data.

11. The method of claim 9, wherein each pseudo-random number in the first set and in the second set is prime.

12. The method of claim 11, wherein:

the generating of the first seed value includes performing one or more cryptographic operations on the first set of two or more answers to generate the first seed value; and the generating of the second seed value includes performing one or more cryptographic operations on the second set of two or more answers to generate the second seed value.

13. The method of claim 9, wherein at least one of the first set of two or more answers is a passphrase, and at least one of the second set of two or more answers is a passphrase.

14. The method of claim 9, further comprising selecting a first set of two or more questions in response to user input, wherein the first set of two or more questions has fewer questions than the plurality of questions.

15. The method of claim 14, further comprising storing the data indicative of the first set of two or more questions in association with a user identifier in a memory of the server.

16. The method of claim 14, wherein the data transmitted to a server indicating the two or more questions specifies an order of the two or more questions.

17. The method of claim 16, wherein:

respective orders of the first and second sets of two or more answers correspond to the order of the two or more questions;

the computing of the first public-private key pair includes computing the first public-private key pair as a function of data representing the first set of two or more answers and ordered according to the respective order of the first set of two or more answers; and the computing of the second public-private key pair includes computing the second public-private key pair as a function of data representing the second set of two or more answers and ordered according to the respective order of the second set of two or more answers.

18. A system for establishing a public-private key pair on a plurality of systems, comprising:

a memory;

a processor coupled to the memory, wherein the memory is configured with instructions that when executed by the processor cause the processor to:

download a security program to an initial requesting device in response to a request from the initial requesting device, wherein the security program when executed on the initial requesting device is configured to cause the initial requesting device to:

display a plurality of questions;

input a first set of two or more answers to two or more of a plurality of questions in response to user input;

generate a first seed value from the first set of two or more answers;

generate a first set of one or more pseudo-random numbers as a function of the first seed value;

compute the public-private key pair as a function of the first set of one or more pseudo-random numbers;

store the public-private key pair in memory of the initial requesting device; and transmit to a server, data indicative of the two or more questions not indicative of the first set of two or more answers, and that is downloadable from the server for generating the public-private key pair on a subsequent requesting device for performing one of authentication or encryption on the initial requesting device and the subsequent requesting device using the public-private key pair.

19. The system of claim 18, wherein the memory is further configured with instructions that when executed by the processor cause the processor to:

store the data indicative of the two or more questions in association with a user identifier in the memory;

download the security program and the data indicative of the two or more questions to the subsequent requesting device in response to a request from the subsequent requesting device, wherein the security program when executed on the subsequent requesting device is configured to cause the subsequent requesting device to:

display the two or more questions;

input a second set of two or more answers to the two or more questions in response to user input;

generate a second seed value from the second set of two or more answers;

generate a second set of one or more pseudo-random numbers as a function of the second seed value;

compute the public-private key pair as a function of the second set of one or more pseudo-random numbers; and store the public-private key pair in memory of the subsequent requesting device.

20. A system for establishing a public-private key pair, comprising:

a memory;

a processor coupled to the memory, wherein the memory is configured with instructions that when executed by the processor cause the processor to:

display a plurality of questions;

input a first set of two or more answers to two or more of a plurality of questions in response to user input;

generate a first seed value from the first set of two or more answers;

generate a first set of one or more pseudo-random numbers as a function of the first seed value;

compute the public-private key pair as a function of the first set of one or more pseudo-random numbers;

store the public-private key pair in the memory; and transmit to a server, data indicative of the two or more questions, not indicative of the answers to the two or more questions, and that is downloadable from the server for generating the public-private key pair on another system for performing one of authentication or encryption on the system and another system using the public-private key pair.

21. The system of claim 20, wherein each of the one or more pseudo-random numbers is prime.

22. The system of claim 20, wherein the memory is further configured with instructions that when executed by the processor in generating the seed value cause the processor to perform one or more cryptographic operations on the first set of two or more answers to generate the seed value.

23. The system of claim 20, wherein at least one answer of the first set of two or more answers is a passphrase.

24. The system of claim 20, wherein the memory is further configured with instructions that when executed by the processor cause the processor to select the two or more questions in response to user input, wherein the two or more questions are less than the plurality of questions.

25. The system of claim 24, wherein the memory is further configured with instructions that when executed by the processor cause the processor to transmit data to a server indicating the two or more questions selected by the user.

26. The system of claim 25, wherein the data transmitted to the server indicating the two or more questions specifies an order of the two or more questions.

* * * * *